(12) United States Patent
Krishnamurthy et al.

(10) Patent No.: US 11,842,228 B2
(45) Date of Patent: Dec. 12, 2023

(54) CONTEXT SPECIFIC ORCHESTRATION OF DATA OBJECTS

(71) Applicant: Dell Products L.P., Round Rock, TX (US)

(72) Inventors: Srikanth Krishnamurthy, Bangalore (IN); Shekar Babu Suryanarayana, Bangalore (IN)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 17/726,578

(22) Filed: Apr. 22, 2022

(65) Prior Publication Data

US 2023/0342227 A1    Oct. 26, 2023

(51) Int. Cl.
*G06F 9/54*   (2006.01)
*G06F 11/34*  (2006.01)

(52) U.S. Cl.
CPC .......... *G06F 9/542* (2013.01); *G06F 11/3438* (2013.01)

(58) Field of Classification Search
CPC ....... G06F 9/542; G06F 9/546; G06F 16/1734
See application file for complete search history.

(56) References Cited

U.S. PATENT DOCUMENTS

| | | | |
|---|---|---|---|
| 8,069,422 B2* | 11/2011 | Sheshagiri | H04L 12/2812 715/825 |
| 11,531,940 B2* | 12/2022 | Gupta | G06Q 10/063114 |
| 2015/0131130 A1* | 5/2015 | Miyasaka | H04N 1/00244 358/403 |
| 2018/0136949 A1* | 5/2018 | Duesterwald | G06F 9/453 |
| 2018/0253219 A1* | 9/2018 | Dotan-Cohen | G06F 16/907 |
| 2021/0329073 A1* | 10/2021 | Sharma | H04M 1/72454 |
| 2023/0162230 A1* | 5/2023 | Warner | G06N 5/042 705/14.53 |

\* cited by examiner

*Primary Examiner* — Andy Ho
(74) *Attorney, Agent, or Firm* — Jackson Walker L.L.P (57) ABSTRACT

Disclosed information handling systems and methods employ a background module running in an operating system of a client platform to evaluate, after defined context-relevant events including, as examples, reboot, application launch, return from sleep/idle mode, change of network connection, and change of device, the impact of the user context change, and to take or recommend appropriate action. Embodied solutions may augment existing communication protocols, such as the Server Message Block (SMB) protocol, that enable and support shared access to files across nodes of a distributed system.

12 Claims, 7 Drawing Sheets

CONTEXT SPECIFIC ORCHESTRATION OF DATA OBJECTS

TECHNICAL FIELD

The present disclosure relates to information handling system management and, more specifically, monitoring and responding to user context changes.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems may be used in many different user contexts including, as illustrative examples, from the office or another private location vs. in public; with an employer-owned device vs. with an employee-owned device; via a corporate/private network vs. a public network, with or without sharing a display screen or another system resource, from within a meeting, after rebooting from an operating system (OS) crash, etc.

User context changes can raise data security and theft issues as well as productivity issues. Examples include, by way of illustration:
  email and other communication messages may preview, pop up, or otherwise become visible while sharing a display screen and/or presenting content to an audience;
  after a virtual machine (VM) migration, a user logging into the post-migration VM, must bring up the applications, services, documents, etc. that were opened/running in the previous VM;
  shared device issues, e.g., different customers may share a thin client device and, without automatic shutdown of earlier customer's context-based software/document and boot up of later customer's context, pre-boot generally lacks intelligence to boot customer specific OS based on customer profile context;
  accessing confidential information on different devices in different environment via different networks, e.g., accessing corporate email from corporate laptop behind corporate firewall vs. mobile device via public WiFi networks.

Conventional context-aware technology may address preservation and recovery of content and may reformat content based on display size and the like, but generally does not otherwise consider context changes or dependencies.

SUMMARY

In accordance with disclosed subject matter pertaining to context-specific management of data objects, a client platform employs a background module, referred to herein as the context event creator (CEC), running, for example, in the client platform operating system (OS), to detect the occurrence of events that may be associated with a user context change. Triggering events may include, as non-limiting examples, a reboot, an application launch, a return from sleep/idle mode, a change of network connection, a change of device, and so forth. Upon detecting a triggering event, the CEC may gather user context information and compare the current context to a prior context, which may be recorded in a storage resource accessible to the CEC. If the CEC determines that a user context change has occurred, the CEC may generate a new instance of a context event (CE).

The CE generation process may leverage and augment existing communication protocols, including but not limited to the server message block (SMB) protocol maintained by Microsoft, that enable and support shared access to files across nodes of a distributed system.

In addition to the CEC, disclosed systems may include a context classifier (CC) that resides on a remote support assist (RSA) resource. The CC may receive each CE and search a context database (CXT DB) to identify a recommended action (RA) and return the RA to the client platform when the CE is found within the CXT DB. When a CE received from the client platform is not found within the CXT DB, the CC may call a machine learning (ML) based resource to learn about the CE, generate an appropriate RA, and save the CE and the corresponding action to the CE database.

Disclosed systems may further include an SMB context service (SCS), which may include an SCS client implemented as a proprietary SMB plugin. This service may facilitate transport of context information and recommended actions between the client platform and the RSA while leveraging SMB-based secure communication features. In at least one embodiment, the SCS generates an SMB context command (SCC) that the CEC and CC may use to communicate context information and recommend action information between the client platform and the RSA.

A context analyzer (CA), residing on the RSA, may apply an ML algorithm to analyze and generate new CE-to-RA mappings when a new species of CE is encountered. In addition, a context action executor (CAE) residing on the client platform may receive RAs from the RSA and execute the RAs to provide context-based awareness and protection.

Thus, in accordance with teachings of the present disclosure, a disclosed information handling system includes a processor and a memory resource, coupled to the processor, including processor-executable program instructions that, when executed by the processor, cause the system to perform operations for monitoring and responding to user context changes. Disclosed operations include, in at least some embodiments, monitoring events associated with a client platform and, in particular, events that may be relevant to the user context associated with the client platform. Upon detecting a context orchestration triggering event, referred to herein simply as a triggering event, the system may retrieve or otherwise determine user context information, indicative of a current user context of the client platform.

A disclosed system may create a context event including or otherwise indicating the context information. The system may then generate a context message corresponding to the context event and send the context message to an RSA resource. The RSA may include a context classifier configured to analyze context events and determine whether a context event is of a type that has been previously received and analyzed. If the context classifier does not recognize the context event type, the context event may be forwarded to a machine learning module to record or otherwise document the new context event type and determine a recommended action corresponding to the context event. Information indicative of the new context event types and their corresponding recommended actions may then be stored in a context database such that the context database includes all known context event types and their corresponding recommended actions. The context classifier may return, to the client platform, the recommended action associated with the context event. The recommended actions, when executed by a client platform module referred to herein as the context action executor, provide context-based features and/or protection to the client platform user.

The events that trigger context orchestration as described herein may include, as non-limiting examples, a reboot or system reset event, an application launch event, a login event, a wake up event, and any other events that may be relevant to the user context. The context information acquired by the context event creator may include user information identifying the user, device information indicative of the user's device, location information indicative of a user's current location, network information, application information indicative of a state of an application program, cloud connectivity information, and document information indicating an open or accessed document.

Embodiments of disclosed systems may leverage and augment an existing network file sharing protocol for communicating context messages and recommended actions between the client platform and the RSA. In at least one such embodiment, context messages may be delivered as part of a server message block (SMB) protocol message. Communicating the context message may comprise communicating the context message via a server message block (SMB) transport. The client platform may incorporate a proprietary SMB plugin for implementing this feature.

The recommending of context awareness actions may include accessing a context awareness database mapping user context events to recommended actions to determine whether the context message is a recognized message. In response to determining that a context message is not a recognized message, disclosed systems may perform machine learning based analysis of the context message to create a new recommended action and store the new recommended action in the database.

Technical advantages of the present disclosure may be readily apparent to one skilled in the art from the figures, description and claims included herein. The objects and advantages of the embodiments will be realized and achieved at least by the elements, features, and combinations particularly pointed out in the claims.

It is to be understood that both the foregoing general description and the following detailed description are examples and explanatory and are not restrictive of the claims set forth in this disclosure.

BRIEF DESCRIPTION OF THE DRAWINGS

A more complete understanding of the summarized resources may be acquired by referring to the following drawings wherein.

DETAILED DESCRIPTION

Exemplary embodiments and their advantages are best understood by reference to FIGS. 1-8, wherein like numbers are used to indicate like and corresponding parts unless expressly indicated otherwise.

For the purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a personal digital assistant (PDA), a consumer electronic device, a network storage device, or any other suitable device and may vary in size, shape, performance, functionality, and price. The information handling system may include memory, one or more processing resources such as a central processing unit ("CPU"), microcontroller, or hardware or software control logic. Additional components of the information handling system may include one or more storage devices, one or more communications ports for communicating with external devices as well as various input/output ("I/O") devices, such as a keyboard, a mouse, and a video display. The information handling system may also include one or more buses operable to transmit communication between the various hardware components.

Additionally, an information handling system may include firmware for controlling and/or communicating with, for example, hard drives, network circuitry, memory devices, I/O devices, and other peripheral devices. For example, the hypervisor and/or other components may comprise firmware. As used in this disclosure, firmware includes software embedded in an information handling system component used to perform predefined tasks. Firmware is commonly stored in non-volatile memory, or memory that does not lose stored data upon the loss of power. In certain embodiments, firmware associated with an information handling system component is stored in non-volatile memory that is accessible to one or more information handling system components. In the same or alternative embodiments, firmware associated with an information handling system component is stored in non-volatile memory that is dedicated to and comprises part of that component.

For the purposes of this disclosure, computer-readable media may include any instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory; as well as communications media such as wires, optical fibers, microwaves, radio waves, and other electromagnetic and/or optical carriers; and/or any combination of the foregoing.

For the purposes of this disclosure, information handling resources may broadly refer to any component system, device or apparatus of an information handling system, including without limitation processors, service processors, basic input/output systems (BIOSs), buses, memories, I/O devices and/or interfaces, storage resources, network interfaces, motherboards, and/or any other components and/or elements of an information handling system.

In the following description, details are set forth by way of example to facilitate discussion of the disclosed subject matter. It should be apparent to a person of ordinary skill in the field, however, that the disclosed embodiments are exemplary and not exhaustive of all possible embodiments.

Throughout this disclosure, a hyphenated form of a reference numeral refers to a specific instance of an element and the un-hyphenated form of the reference numeral refers to the element generically. Thus, for example, "device 12-1" refers to an instance of a device class, which may be referred to collectively as "devices 12" and any one of which may be referred to generically as "a device 12".

As used herein, when two or more elements are referred to as "coupled" to one another, such term indicates that such two or more elements are in electronic communication, mechanical communication, including thermal and fluidic communication, thermal, communication or mechanical communication, as applicable, whether connected indirectly or directly, with or without intervening elements.

Figure 1:
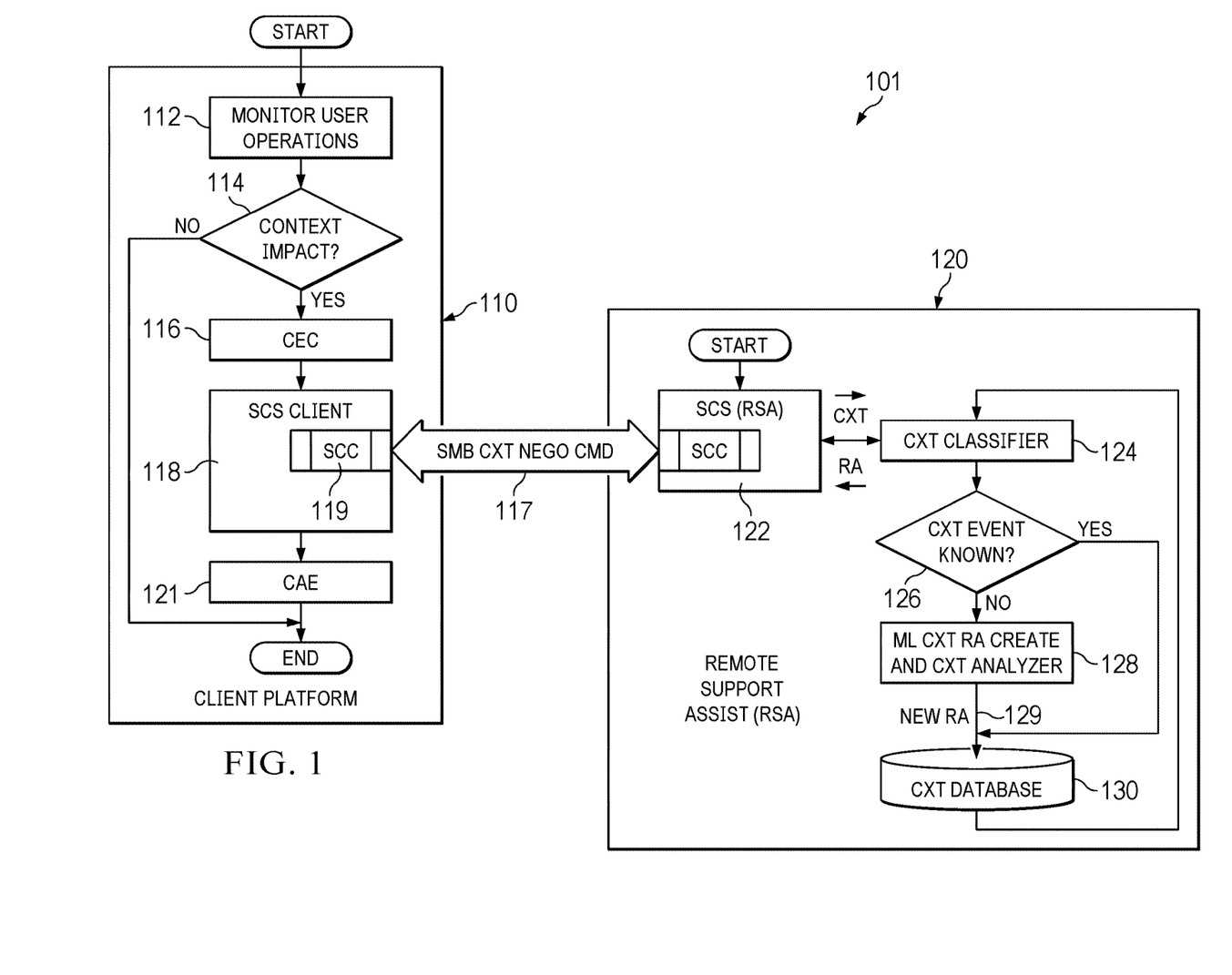
FIG. 1 illustrates an exemplary context orchestration system including client platform and remote support assist.

Referring now to the drawings, FIG. 1 illustrates an information handling system 101 suitable for implementing context-specific management of data objects as disclosed herein. The information handling system 101 illustrated in FIG. 1 includes a client platform 110 communicatively coupled to a context knowledge resource, referred to herein as remote support assist (RSA) 120, configured to perform depicted context-based operations.

The client platform 110 illustrated in FIG. 1 may include a background module, i.e., a module executing in the OS of client platform 110, to perform operations illustrated in FIG. 1. The operations illustrated in FIG. 1 include monitoring (block 112) user operations to detect any of a defined group of events that trigger the context-based management operations disclosed herein. As suggested previously, the triggering events may include a reboot, the launch of a new application, a change in the network connection or configuration of the client platform, and so on. Whenever a triggering event is detected, the illustrated client platform determines (block 114) whether the event may have a user context impact, i.e., whether the triggering event is associated with a change in user context. Determining the user context impact may include determining a current user context, as discussed in more detail with respect to FIG. 2, and comparing the current user context to a previous user context. Upon determining in block 114 that an event has a user context impact, the illustrated client platform invokes a CEC 116 to generate a context event that will be communicated to RSA 120.

The information handling system 101 illustrated in FIG. 1 leverages the SMB protocol to implement selected elements, including SCS client 118 and SCC 119. If the client platform 110 illustrated in FIG. 1 determines, in block 114, that a triggering event has a context impact, i.e., is associated with a user context change, client platform 110 invokes CEC 116 to generate a CE (not explicitly depicted in FIG. 1) and forward the CE to SCS client 118. SCS client 118 may then generate SCC 119 and send SCC 119 to RSA 120 via an SMB-based transport 117. RSA 120 may subsequently send a recommended action back to client platform 110 and, more specifically, back to SCS client 118. The recommended action received from RSA 120 may be forwarded to context action executor 121, which is configured to perform recommended actions. If, as an example, a recommended action includes a recommendation to close all open documents and/or emails, CAE 121 is configured to perform those actions.

The SCS client 118 illustrated in FIG. 1 may be implemented as a proprietary plug-in for supporting disclosed context management features with an SMB-compliant messaging protocol between client platform 110 and RSA 120. Leveraging an existing communication protocol, such as SMB, beneficially facilitates secure transport of user context events to RSA 120 and RA from RSA 120.

The RSA 120 illustrated in FIG. 1 includes an SCS module 122 that receives SCC 119 from client platform 110 and forwards the SCC 119 to context classifier 124. Context classifier 124 determines (block 126) whether the context event indicated by SCC 119 is a known event, i.e., the same or substantially the same as a previously received and classified event. If the context event is not known, the context event is forwarded to a machine learning (ML)-based analyzer 128 to analyze the context command and to create a corresponding recommended action. The illustrated ML-based analyzer 128, after analyzing a previously unknown context command and identifying a recommended action, stores the context command and the corresponding recommended action in context database 130, after which context classifier 124 will be able to recognize the context command in the future. Context database 130 includes a store for context commands and their corresponding recommended actions. The context database 130 of FIG. 1 is depicted forwarding a new recommended action (RA) 129, via context classifier 124 to the client platform 110.

Figure 2:
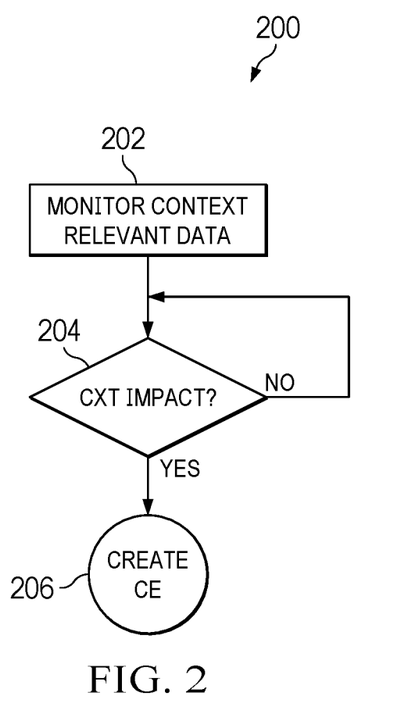
FIG. 2 illustrates an exemplary background process running on the client platform.

FIG. 2 is a flow diagram illustrating exemplary operations of a method 200 performed by a background module of client platform 110 (FIG. 1). The method 200 illustrated in FIG. 2 monitors (block 202) context-relevant data and creates (block 206) a context event (CE) whenever the monitored data indicates (block 204) that the monitored data may have a context impact, i.e., may reflect that a change in user context has occurred.

Figure 3:
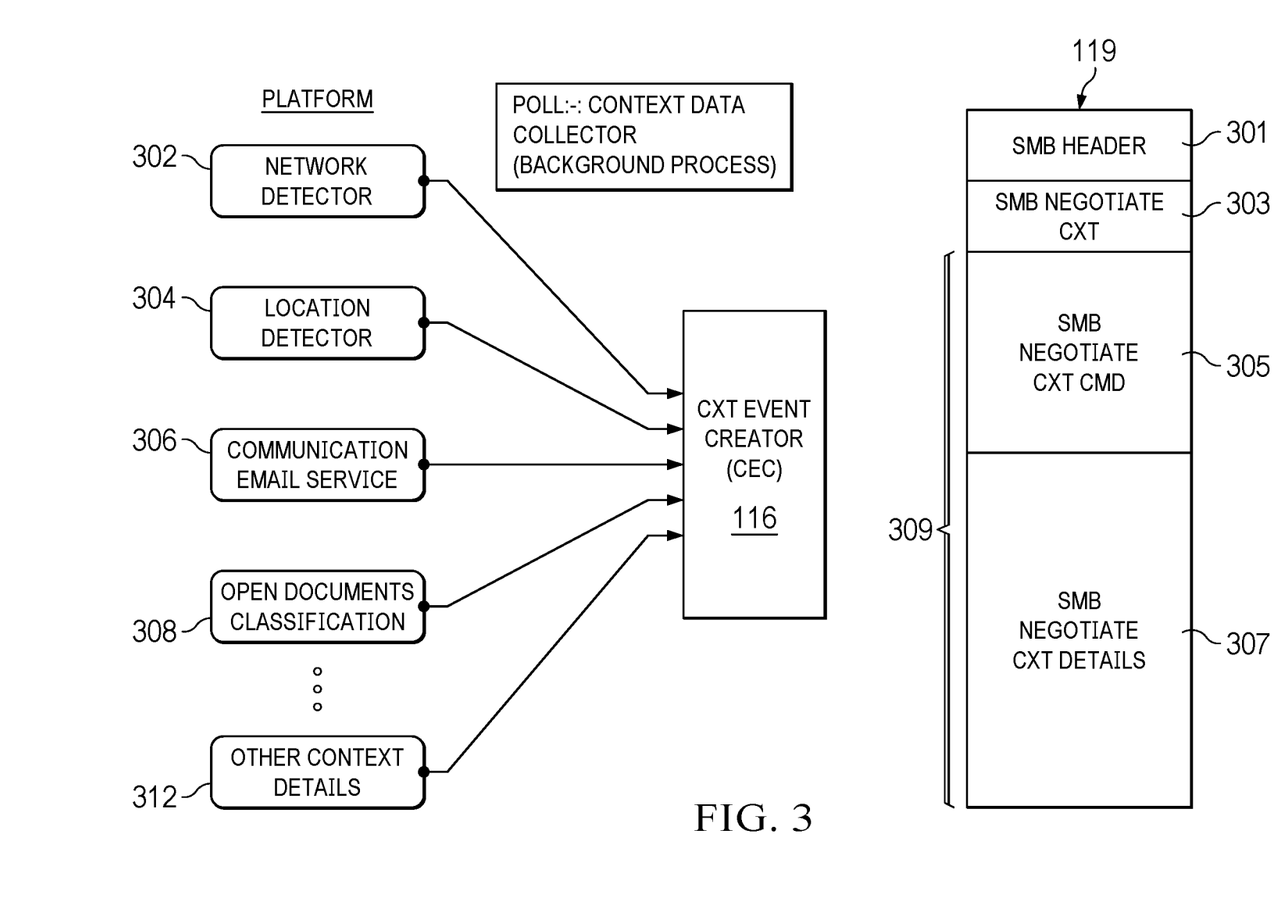
FIG. 3 illustrates features and aspects of an SMB context command and context command creator.

FIG. 3 illustrates an exemplary CEC 116 configured to monitor context relevant information including, in the illustrated example, network information provided by a network detector 302, location information provided by a location detector 304, email/communication information 306 associated with an email/communication service, open document information 308, and other context details 312. The specific items of information illustrated in FIG. 3 are exemplary and those of ordinary skill in the field will readily appreciate that more, fewer, and/or different items of context-relevant information may be employed in other implementations.

FIG. 3 further illustrates an exemplary SCC 119 generated by CEC 116. The illustrated SCC 119 is a proprietary SMB extension for communicating user context information between client platform 110 (FIG. 1) and RSA 120 (FIG. 1). SCC 119 may be generated by or in conjunction with an SMB context service plugin. In at least some embodiments, SCC 119 is established as part of the SMB negotiation process between client platform 110 and RSA 120. Embodiments support functionality to create different SCCs for different categories of context information including, as non-limiting examples, network, location, communication/email service, document modifications, and the like. The SCC 119 illustrated in FIG. 3 is an SMB-based message that includes an SMB-compliant packet header 301 a proprietary form of an SMB Negotiate request, referred to herein as an SMB Negotiate CXT request 303, and a payload 309 that includes a specific CXT command 305 and the corresponding data 307. By embedding the context data in an SMB message payload, authentication and data integrity are ensured by security features inbuilt within SMB.

Figure 4:
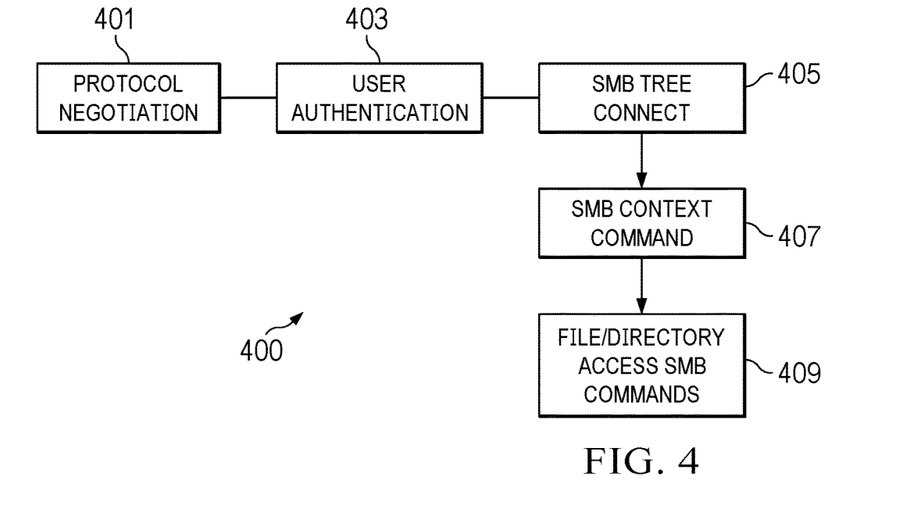
FIG. 4 and FIG. 5 illustrate protocol aspects and features of a disclosed SMB context command.
Figure 5:
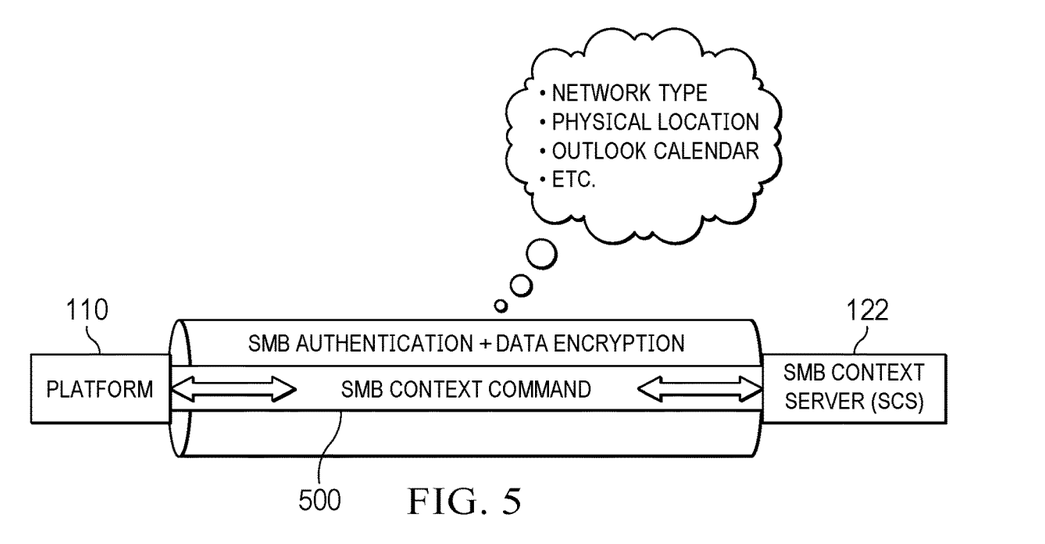

FIG. 4 and FIG. 5 illustrate an exemplary operational sequence 400 (FIG. 4) and an exemplary transport 500 (FIG. 5) for implementing disclosed user context services within an SMB-based framework. The operational sequence 400 illustrated in FIG. 4 begins with a standard SMB negotiation operation 401, during which encryption, compression, signing, and other protocol capabilities are negotiated between client platform 110 and SCS module 122. After the user is successfully authenticated (operation 403), an SMB tree connect (operation 405) is performed to connect the client platform to a remote share in which user context database 130 (FIG. 1) resides. After the tree connection completes, SCC 119 is triggered in block 407 to enable file directory access 409 via SMB commands. By triggering SCC 119 after a secure connection is established, the SCC is inherently secured by SMB protocol features.

In at least some embodiments, SCC 119 is implemented as an SMB context service plugin, enabling any system with SMB support to implement user context features described herein. The plugin may support different user context commands for different user context attributes. The plugin may further support receipt and processing of recommended actions generated by the SCC.

Figure 6:
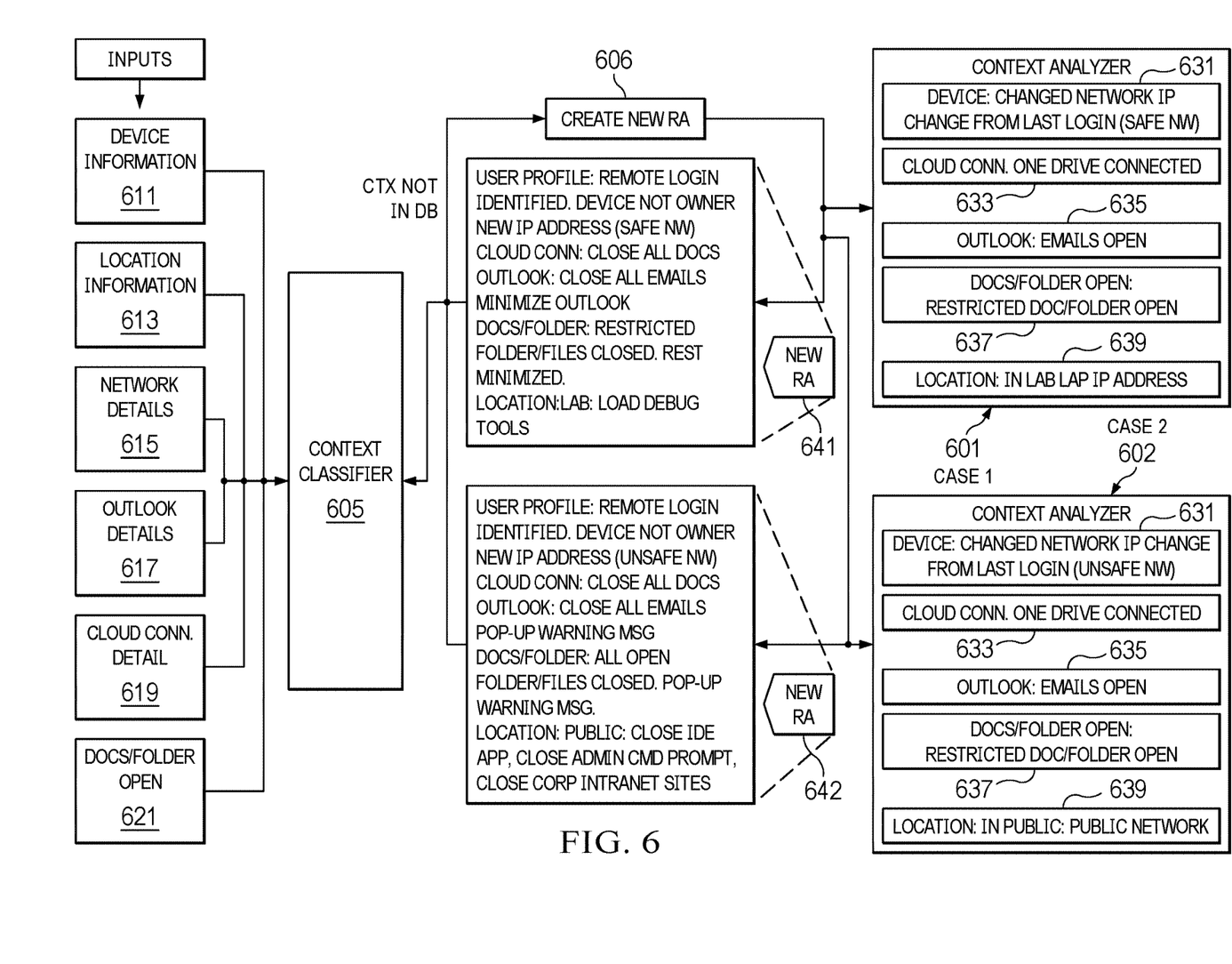
FIG. 6 and FIG. 7 illustrate exemplary user context orchestration use cases.

FIG. 6 illustrates disclosed user context management features for generating processing new types of context events and generating new recommended actions for a pair of exemplary use cases including a first use case 601 and a second use case 602. First use case 601 corresponds to a scenario in which an entity's employee, who had logged into a first device, such as the employee's employer-provided laptop, subsequently logs in via a second entity device, such as a laptop or desktop logs in a lab. In the second use case 602 illustrated in FIG. 6, an employee logs in through an approved mobile device from a coffee shop or a similar public location. In each use case, context classifier receives inputs including device information 611, location information 613, network details 615, Outlook details 617, cloud connect details 619, and documents/folders open information 621. FIG. 6 illustrates examples in which, because context classifier 605 finds neither use case in context database, new RAs must be created (block 606). FIG. 6 further illustrates exemplary user context attributes considered by the illustrated context classifier, including a device attribute 631, cloud connection attribute 633, an Outlook attribute 635 indicative of whether emails are open, a Docs/Folder attribute 637 indicative of whether any restricted documents or folders are open, and a location parameter 639 indicative of a user context IP address. FIG. 6 still further illustrates a new RA 641 generated for use case 601 and a new RA 642 generated for use case 602. New RA 641 and new RA 642 include some common actions and some actions unique to the applicable use case. For example, because second use case 602 involves a unsafe public network, RA 642 is associated with more aggressive context-based actions including, as examples, popping up warning messages regarding open emails and docs/folders, and the closing of IDE application, admin command line, and corporate intranet sites.

Figure 7:
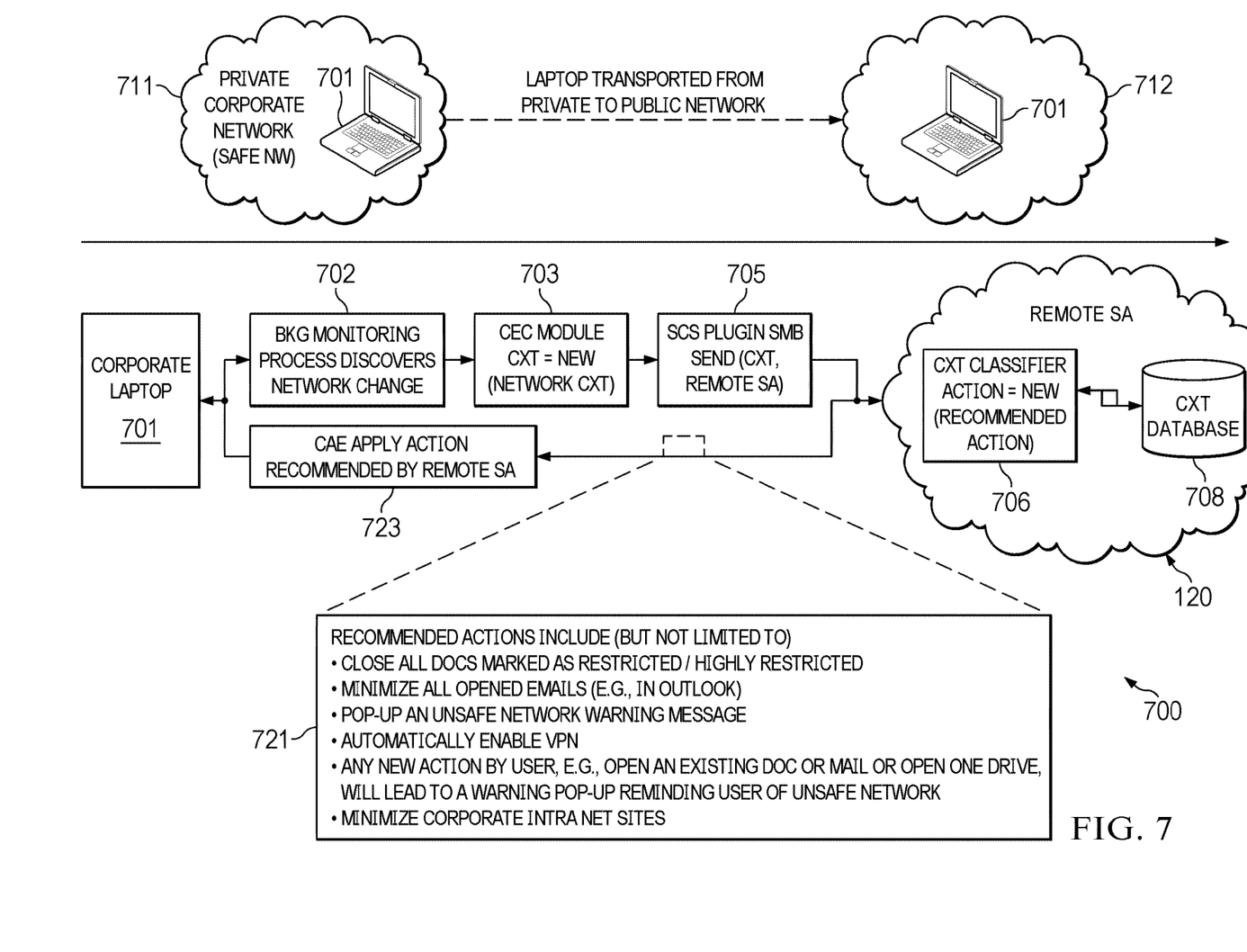

FIG. 7 illustrates a user context use case 700 in which a laptop 701 is transported from a private corporate network 711 to an unsafe public network 712. FIG. 7 illustrates the background monitoring (block 702) of the corporate laptop to discover network changes. The CEC module then creates (block 703) a new context event corresponding to the change in network, i.e., the new CE is a network-context CE. The new CE is provided to SCS plug-in 705, which executes an SMB send command to send the context information to RSA 120. The RSA 120 illustrated in FIG. 7 includes a context classifier 706 coupled to context classifier database 708. The context classifier 706 illustrated in FIG. 7 generates a new RA 721 corresponding to the detect user context change. The illustrated RA 721 recommends, as non-limiting examples: closing all restricted and highly restricted documents, minimizing all opened email, e.g., in Outlook, automatically enabling a virtual private network (VPN), and the generation of warning pop-up messages following any new action by the user, such as opening a document or mail, opening a cloud-based file hosting service such as Microsoft OneDrive, etc. FIG. 7 further illustrates RA 721 being sent to and received by the client platform where the CAE applies (block 723) the action(s) recommended by the RSA.

Figure 8:
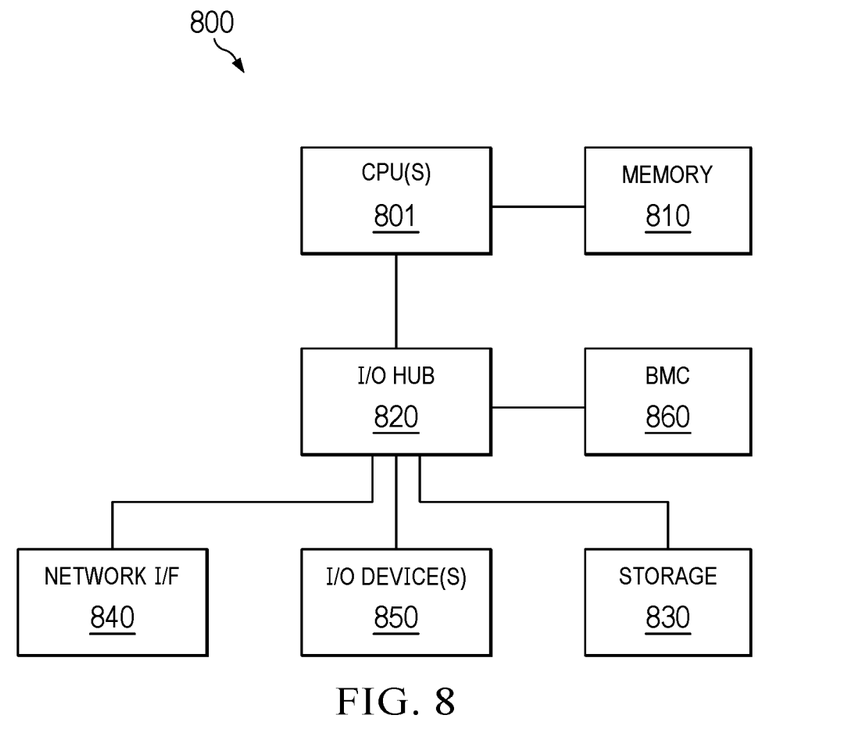
FIG. 8 is a block diagram of an exemplary information handling system.

Referring now to FIG. 8, any one or more of the elements illustrated in FIG. 1 through FIG. 7 may be implemented as or within an information handling system exemplified by the information handling system 800 illustrated in FIG. 8. The illustrated information handling system includes one or more general purpose processors or central processing units (CPUs) 801 communicatively coupled to a memory resource 810 and to an input/output hub 820 to which various I/O resources and/or components are communicatively coupled. The I/O resources explicitly depicted in FIG. 8 include a network interface 840, commonly referred to as a NIC (network interface card), storage resources 830, and additional I/O devices, components, or resources 850 including as non-limiting examples, keyboards, mice, displays, printers, speakers, microphones, etc. The illustrated information handling system 800 includes a baseboard management controller (BMC) 860 providing, among other features and services, an out-of-band management resource which may be coupled to a management server (not depicted). In at least some embodiments, BMC 860 may manage information handling system 800 even when information handling system 800 is powered off or powered to a standby state. BMC 860 may include a processor, memory, an out-of-band network interface separate from and physically isolated from an in-band network interface of information handling system 800, and/or other embedded information handling resources. In certain embodiments, BMC 860 may include or may be an integral part of a remote access controller (e.g., a Dell Remote Access Controller or Integrated Dell Remote Access Controller) or a chassis management controller.

This disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative.

All examples and conditional language recited herein are intended for pedagogical objects to aid the reader in understanding the disclosure and the concepts contributed by the inventor to furthering the art, and are construed as being without limitation to such specifically recited examples and conditions. Although embodiments of the present disclosure have been described in detail, it should be understood that various changes, substitutions, and alterations could be made hereto without departing from the spirit and scope of the disclosure.

What is claimed is:

1. A method comprising:
monitoring user events associated with a client platform;
responsive to detecting a particular user operation event comprising a triggering event, determining context information, indicative of a current user context of the client platform, and communicating a context message, indicative of the user context information, to a remote support assist (RSA) resource configured to recommend context awareness actions for user context changes;
responsive to receiving a recommendation message indicative of a context awareness action, executing the context awareness action on the client platform; and
responsive to determining the context message is not a recognized message, performing machine learning based analysis of the context message to create a new recommended action and storing the new recommended action in a context awareness database mapping user context events to recommended actions.

2. The method of claim 1, wherein the triggering event is selected from a group of triggering events comprising: a reboot event, an application launch event, a login event, and a wake up event.

3. The method of claim 1, wherein the context information includes one or more of: user information identifying the user; location information indicative of a location of the user; network information; application information indicative of a state of an application program; cloud connectivity information; and document information indicating an open or accessed document.

4. The method of claim 1, wherein communicating the context message comprises communicating the context message via a server message block (SMB) transport.

5. The method of claim 4, wherein communicating the context message is performed by a proprietary SMB plugin.

6. The method of claim 1, wherein recommending context awareness actions includes accessing the context awareness database to determine whether the context message is a recognized message.

7. An information handling system, comprising:
a processor;
a memory, coupled to the processor, including processor executable program instructions that, when executed by the processor, cause the system to perform operations including:
monitoring user events associated with a client platform;
responsive to detecting a particular user operation event comprising a triggering event, determining context information, indicative of a current user context of the client platform, and communicating a context message, indicative of the user context information, to a remote support assist (RSA) resource configured to recommend context awareness actions for user context changes;
responsive to receiving a recommendation message indicative of a context awareness action, executing the context awareness action on the client platform; and
responsive to determining the context message is not a recognized message, performing machine learning based analysis of the context message to create a new recommended action and storing the new recommended action in a context awareness database mapping user context events to recommended actions.

8. The information handling system of claim 7, wherein the triggering event is selected from a group of triggering events comprising: a reboot event, an application launch event, a login event, and a wake up event.

9. The information handling system of claim 7, wherein the context information includes one or more of: user information identifying the user; location information indicative of a location of the user; network information; application information indicative of a state of an application program; cloud connectivity information; and document information indicating an open or accessed document.

10. The information handling system of claim 7, wherein communicating the context message comprises communicating the context message via a server message block (SMB) transport.

11. The information handling system of claim 10, wherein communicating the context message is performed by a proprietary SMB plugin.

12. The information handling system of claim 7, wherein recommending context awareness actions includes accessing the context awareness database to determine whether the context message is a recognized message.

* * * * *